US012798467B2

(12) United States Patent
Ortiz Gonzalez et al.

(10) Patent No.: US 12,798,467 B2
(45) Date of Patent: Nov. 17, 2026

(54) TAILGATE ASSEMBLY INCLUDING DEPLOYABLE WORKSTATION

(71) Applicant: Ford Global Technologies, LLC, Dearborn, MI (US)

(72) Inventors: Bernardo Ortiz Gonzalez, Distrito Federal (MX); David Diaz, Calimaya (MX)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 18/607,903

(22) Filed: Mar. 18, 2024

(65) Prior Publication Data

US 2025/0289356 A1 Sep. 18, 2025

(51) Int. Cl.
*B60P 3/14* (2006.01)
*B62D 33/027* (2006.01)

(52) U.S. Cl.
CPC ............ *B60P 3/14* (2013.01); *B62D 33/0273* (2013.01)

(58) Field of Classification Search
CPC .............. B62D 33/0273; B62D 33/027; B62D 33/023; B62D 33/0276; B60P 3/14
USPC .......................................................... 296/26.02
See application file for complete search history.

(56) References Cited

U.S. PATENT DOCUMENTS 5,427,033 A * 6/1995 Bly ........................ B60N 3/002 108/44
5,575,521 A * 11/1996 Speis ................. B62D 33/0273 296/26.11
5,649,731 A 7/1997 Tognetti
6,109,187 A 8/2000 Cottle et al.
6,364,391 B1 * 4/2002 Everett ................ B60N 2/3095 296/57.1
6,824,183 B1 11/2004 Hodge
6,941,655 B1 9/2005 Bisland
10,358,072 B2 7/2019 Wereski
10,974,656 B2 4/2021 Keck
2004/0207226 A1 10/2004 Johnson
2005/0225117 A1 10/2005 Mishech et al.
2008/0061097 A1 3/2008 Milender et al.
2008/0231064 A1 9/2008 Plavetich
2015/0047536 A1 2/2015 Parks et al.
2020/0164781 A1 * 5/2020 Pascarella ................. B60R 9/06
2022/0314889 A1 10/2022 Glickman et al.
2023/0299061 A1 9/2023 Yamaguchi et al.
2024/0109604 A1 * 4/2024 Pard ..................... B62D 33/027

OTHER PUBLICATIONS

My standing truck desk. MyTruckDesk. (n.d.). https://mytruckdesk.com/products/my-standing-truck-desk.

* cited by examiner

*Primary Examiner* — Caroline N Butcher
(74) *Attorney, Agent, or Firm* — Vichit Chea; Carlson, Gaskey & Olds, P.C.

(57) ABSTRACT

A tailgate assembly for a motor vehicle may include a tailgate moveable between a closed position and an open position and a deployable workstation including at least one panel. An upper surface of the at least one panel provides a work surface. When the tailgate is in the open position, the deployable workstation is movable relative to the tailgate between a stowed position and at least one raised position in which the at least one panel is raised relative to the stowed position. The deployable workstation is configured such that the at least one panel is moveable from the stowed position by sliding rearward before being raised.

17 Claims, 8 Drawing Sheets

TAILGATE ASSEMBLY INCLUDING DEPLOYABLE WORKSTATION

TECHNICAL FIELD

This disclosure relates to a tailgate assembly for a motor vehicle. In particular, the tailgate assembly includes a deployable workstation. A corresponding method is also disclosed.

BACKGROUND

Many motor vehicles include cargo spaces for transporting various types of cargo. A pickup truck, for example, includes a cargo bed that establishes the cargo space of the truck. A tailgate typically encloses a rear of the cargo bed. The tailgate is movable between closed and open positions for enclosing and accessing the cargo bed, respectively.

SUMMARY

In some aspects, the techniques described herein relate to a motor vehicle, including: a tailgate moveable between a closed position and an open position; and a deployable workstation including at least one panel, wherein an upper surface of the at least one panel provides a work surface, wherein, when the tailgate is in the open position, the deployable workstation is movable relative to the tailgate between a stowed position and at least one raised position in which the at least one panel is raised relative to the stowed position, and wherein the deployable workstation is configured such that the at least one panel is moveable from the stowed position by sliding rearward before being raised.

In some aspects, the techniques described herein relate to a motor vehicle, wherein the at least one panel includes a first panel and a second panel.

In some aspects, the techniques described herein relate to a motor vehicle, wherein the first panel is rotatable relative to the second panel between a folded position and an unfolded position to vary a surface area of the work surface.

In some aspects, the techniques described herein relate to a motor vehicle, wherein, in the folded position, the first panel substantially vertically overlaps the second panel.

In some aspects, the techniques described herein relate to a motor vehicle, wherein, in the unfolded position, a surface of the first panel and a surface of the second panel provide the work surface.

In some aspects, the techniques described herein relate to a motor vehicle, wherein, in the unfolded position, the surface of the first panel and the surface of the second panel substantially lie in a common plane.

In some aspects, the techniques described herein relate to a motor vehicle, wherein, in the unfolded position, the work surface exhibits a surface area substantially twice the surface area of the work surface in the folded position.

In some aspects, the techniques described herein relate to a motor vehicle, wherein, in the unfolded position, the work surface exhibits a surface area substantially twice the surface area of an upper surface of the tailgate.

In some aspects, the techniques described herein relate to a motor vehicle, wherein the deployable workstation includes a linkage assembly configured to facilitate sliding and raising of the at least one panel relative to the tailgate.

In some aspects, the techniques described herein relate to a motor vehicle, wherein: the linkage assembly includes a first link and second link connected to a pin adjacent respective first ends thereof, and the pin is received in a slot formed in a side of the at least one panel.

In some aspects, the techniques described herein relate to a motor vehicle, wherein second ends of the first and second links are moveable relative to one another to raise and lower the at least one panel.

In some aspects, the techniques described herein relate to a motor vehicle, wherein the at least one raised position includes a plurality of raised positions, and each of the raised positions corresponds to a different distance between the second ends of the first and second links.

In some aspects, the techniques described herein relate to a motor vehicle, wherein the first and second links are moveable to raise the work surface to a height within a range between substantially 800 mm and substantially 900 mm above a ground surface.

In some aspects, the techniques described herein relate to a motor vehicle, wherein the deployable workstation includes a support leg forward of the linkage assembly.

In some aspects, the techniques described herein relate to a motor vehicle, wherein the support leg includes first and second vertical portions and a horizontal portion extending between the first and second vertical portions, and wherein, when the support leg is deployed, the horizontal portion is configured to contact a floor of a cargo area of the motor vehicle or the tailgate.

In some aspects, the techniques described herein relate to a motor vehicle, including: a tailgate moveable between a closed position and an open position; and a deployable workstation including a first panel and a second panel, wherein, when the tailgate is in the open position, the first and second panel are movable relative to the tailgate between a stowed position and at least one raised position in which the first and second panels are raised relative to the stowed position, and wherein the first panel and second panel are configurable relative to one another to provide a work surface exhibiting a surface area substantially twice a surface area of an upper surface of the tailgate.

In some aspects, the techniques described herein relate to a method, including: opening a tailgate of a motor vehicle; after the opening step, sliding at least one panel of a deployable workstation rearward relative to the tailgate without also raising the at least one panel, wherein the at least one panel is configured to provide a work surface; and after the sliding step, raising the at least one panel relative to the tailgate.

In some aspects, the techniques described herein relate to a method, wherein the at least one panel includes a first panel and a second panel, and wherein the method further includes rotating the first panel relative to the second panel from a folded position to an unfolded position to provide a work surface having a surface area substantially twice an upper surface of the tailgate.

In some aspects, the techniques described herein relate to a method, wherein the raising step includes raising the at least one panel such that the work surface is within a range of substantially 800 mm and substantially 900 mm above a ground surface.

In some aspects, the techniques described herein relate to a method, wherein the deployable workstation includes a linkage assembly configured to facilitate sliding and raising of the at least one panel, wherein the method further includes moving a support leg to a deployed position to support the at least one panel, and wherein the support leg is forward of the linkage assembly.

BRIEF DESCRIPTION OF THE DRAWINGS

In FIG. 2 a deployable workstation is in a stowed position.

DETAILED DESCRIPTION

This disclosure relates to a tailgate assembly for a motor vehicle. In particular, the tailgate assembly includes a deployable workstation. A corresponding method is also disclosed. This disclosure provides a relatively large work surface at a convenient height. The work surface is intuitively and readily accessed. These and other benefits will be appreciated from the following description.

Figure 1:
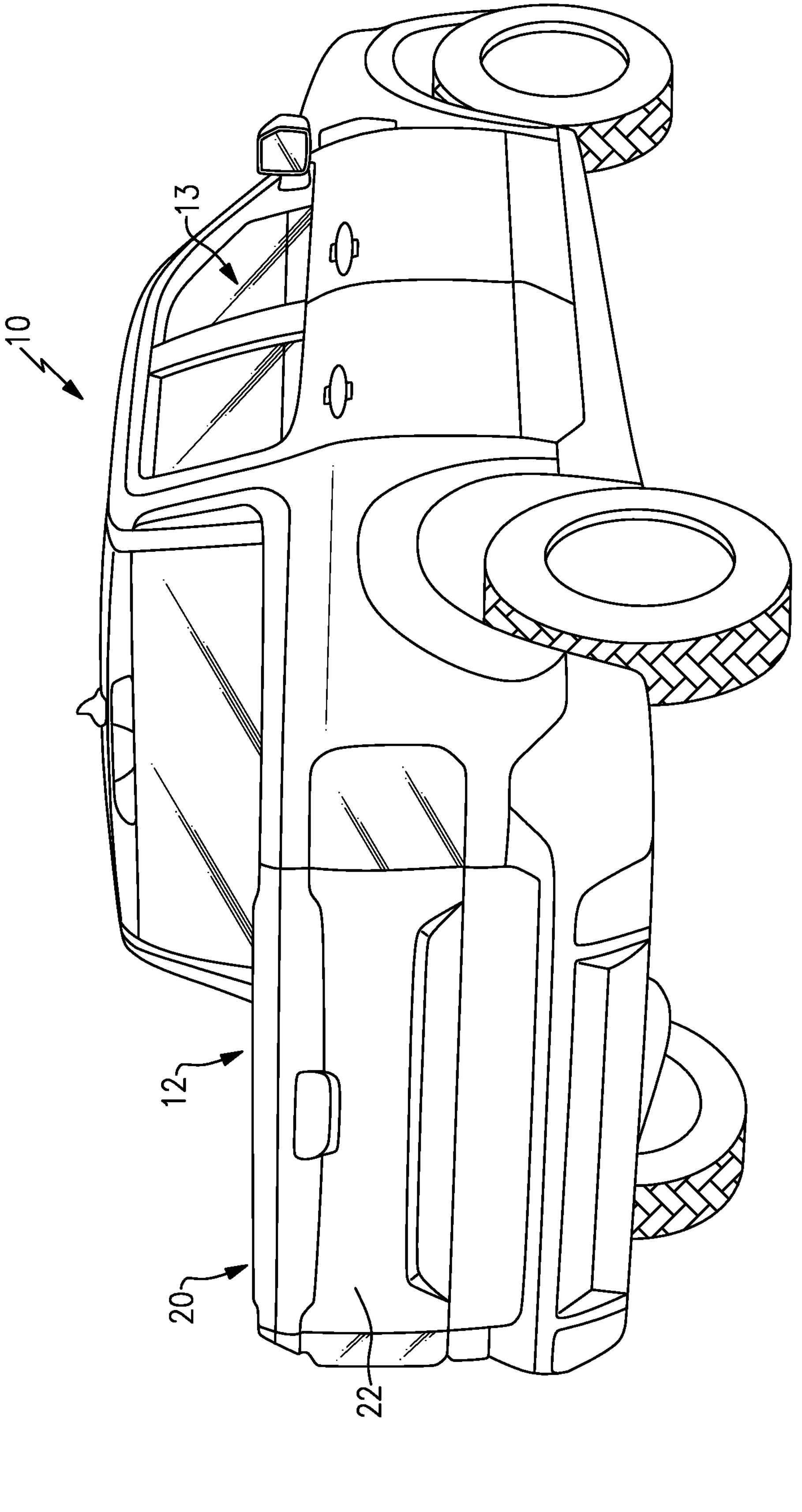
FIG. 1 is a rear perspective view of a motor vehicle equipped with a cargo space and a tailgate assembly positioned in a closed position.

FIG. 1 illustrates a motor vehicle 10 from a rear perspective. In FIG. 1, the motor vehicle 10 is a pickup truck. The motor vehicle 10 includes a cargo space for storing and/or hauling one or more items of cargo. In the illustrated embodiment, the cargo space is established by a cargo bed 12 of the pickup truck. While a pickup truck with a cargo bed is specifically depicted and referenced herein, other vehicles having other types of cargo spaces could also benefit from the teachings of this disclosure. Further, the motor vehicle 10 could be a conventional, internal combustion engine powered vehicle, a traction battery powered electric or hybrid vehicle, an autonomous vehicle, etc.

Figure 2:
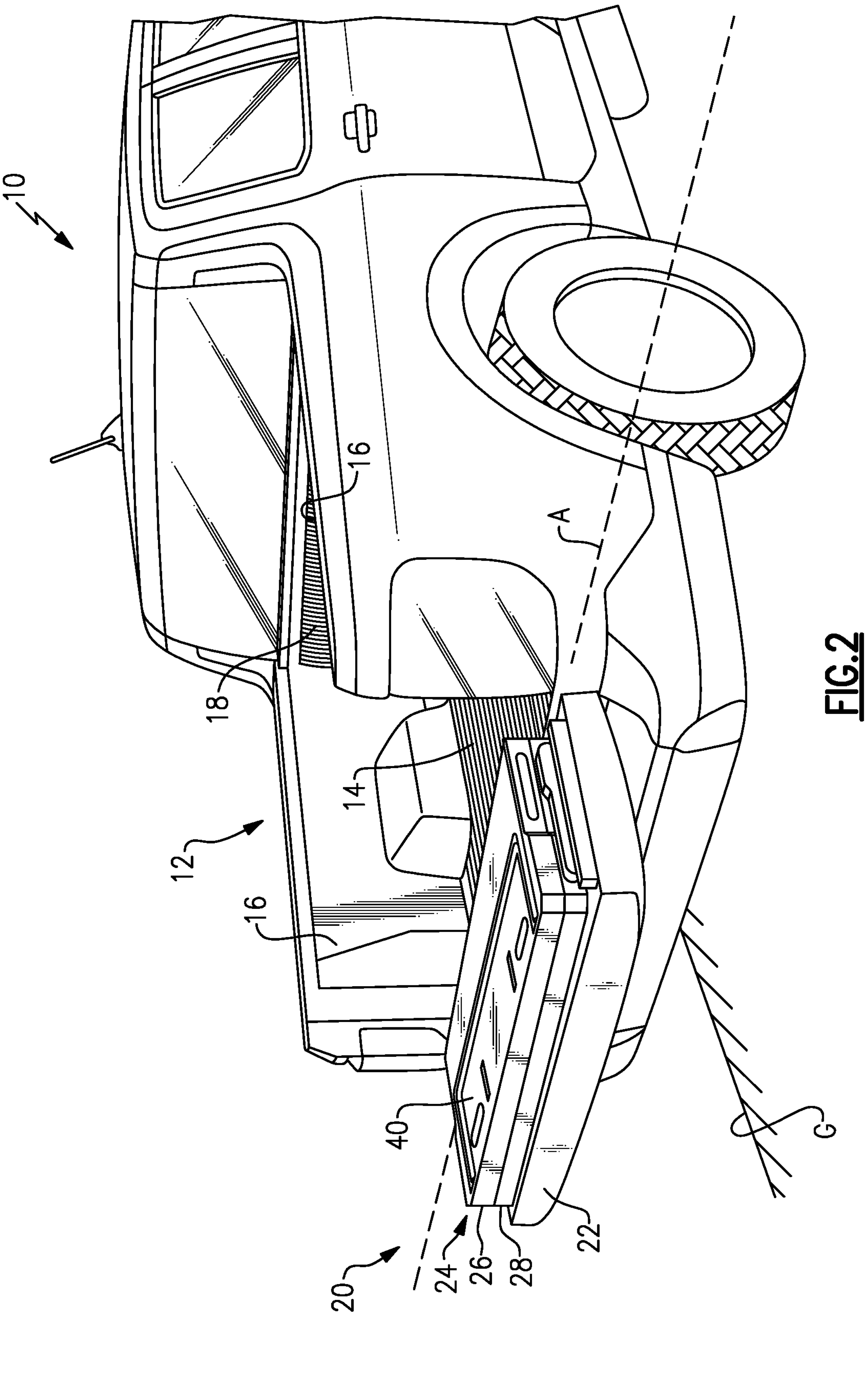
FIG. 2 illustrates the tailgate assembly in an open position.

The cargo bed 12 is generally rearward of a passenger cabin 13 of the motor vehicle 10. With reference to FIG. 2, the cargo bed 12 includes a floor 14 extending between a pair of longitudinally extending side walls 16, a laterally extending front wall 18, and a tailgate assembly 20. The overall size, shape, and configuration of the cargo bed 12 are not intended to limit this disclosure.

In this disclosure, the tailgate assembly 20 includes a tailgate 22 and a deployable workstation 24. The tailgate 22 extends laterally between the side walls 16 and is configured to enclose the cargo bed 12 from the rear when the tailgate 22 is in a closed position, as shown in FIG. 1. The tailgate 22 is moveable between the closed position of FIG. 1 and an open position, as shown in FIG. 2. Specifically, the tailgate 22 is pivotable about an axis A when moving between the closed position and the open position. Movement of the tailgate 22 between the open and closed positions results in corresponding movement of the deployable workstation 24, which is mounted relative to the tailgate 22. The tailgate 22 may be moved from the closed position to the open position in response to actuating a handle of the tailgate assembly 20, for example.

Figure 3:
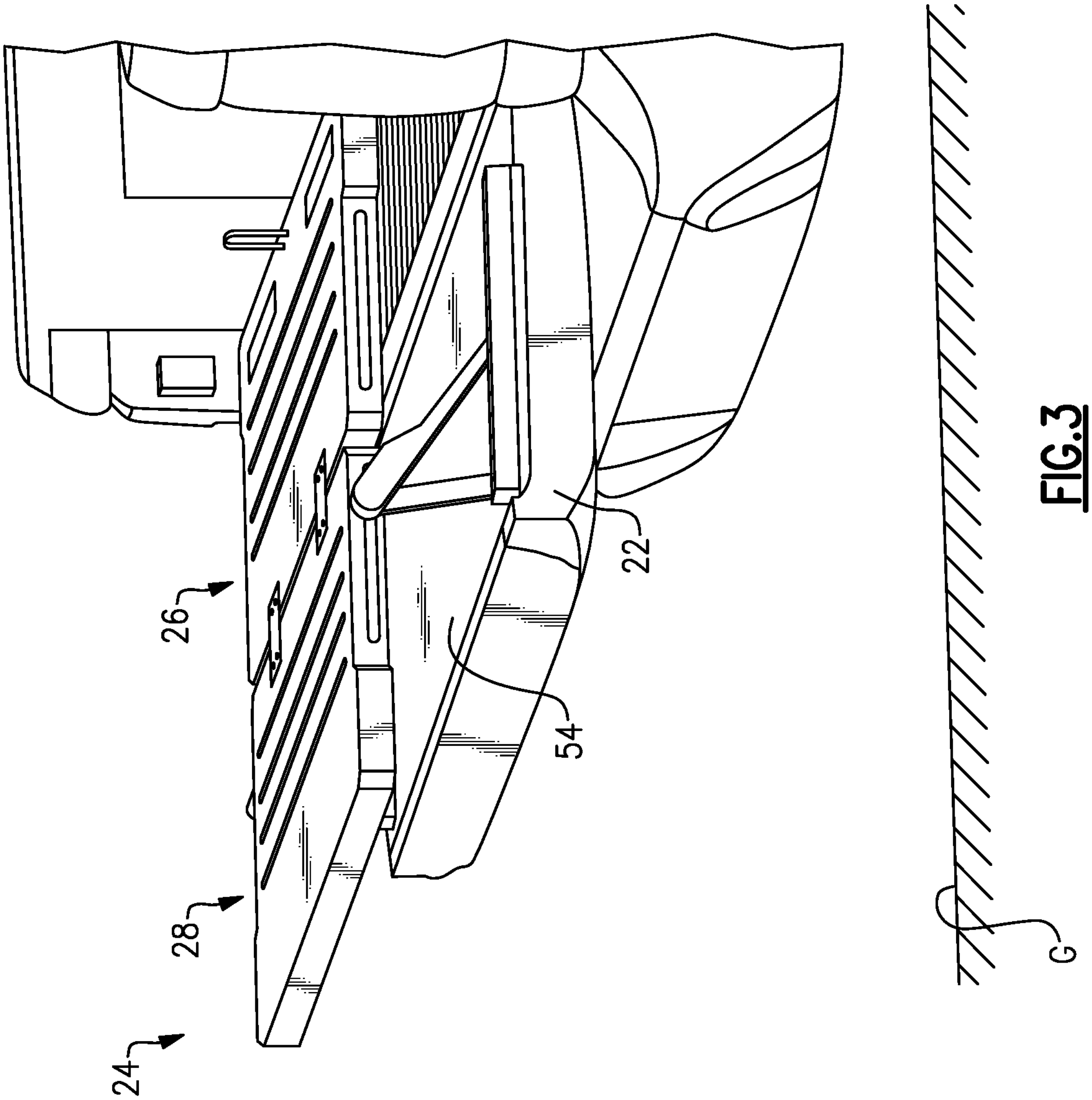
FIG. 3 is a view similar to FIG. 2 and illustrates the deployable workstation in a raised position with panels in an unfolded position.

When the tailgate 22 is in the open position, the deployable workstation 24 is moveable relative to the tailgate 22 between a stowed position, as shown in FIG. 2, and at least one raised position, such as that shown in FIG. 3. In the raised position, the deployable workstation 24 provides a work surface that is substantially parallel to a ground surface G adjacent the motor vehicle 10 and can support various objects to facilitate performance of various tasks. As examples, the work surface can be used as one or more of a workbench, an office desk, a food preparation or food serving surface, etc.

Figure 4:
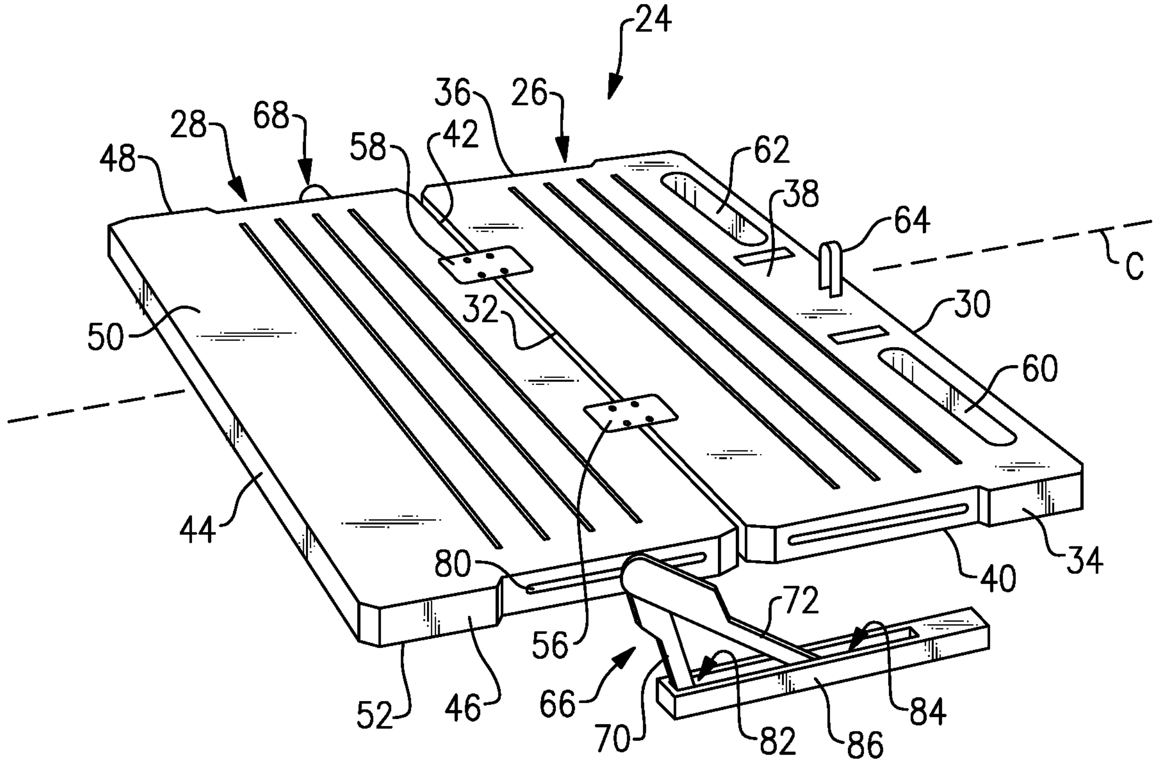
FIG. 4 is a view of the deployable workstation similar to FIG. 3, with the motor vehicle removed for ease of reference.

FIG. 4 illustrates the deployable workstation 24 without the remainder of the motor vehicle 10 for ease of reference. The deployable workstation 24 is shown from a side-perspective view, and in particular is shown from a perspective rearward of the motor vehicle 10 and on the passenger side (in regions such as North America). In this embodiment, the deployable workstation 24 is substantially symmetrical about its centerline C, which in this example is perpendicular to the axis A and, when the deployable workstation 24 is mounted to the motor vehicle 10, is substantially coextensive with the centerline of the motor vehicle 10.

As shown, the deployable workstation 24 includes at least one panel. In this example, the deployable workstation includes a first panel 26 and a second panel 28. The first panel 26 includes a first end 30, a second end 32 opposite the first end 30, a first side 34 extending between the first and second ends 30, 32, and a second side 36 opposite the first side 34 and extending between the first and second ends 30, 32. The first panel 26 includes a first surface 38, which in the configuration of FIG. 4 is an upper surface, and a second surface 40, which in the configuration of FIG. 4 is a lower surface.

The second panel 28 includes a first end 42, a second end 44 opposite the first end 42, a first side 46 extending between the first and second ends 42, 44, and a second side 48 opposite the first side 46 and extending between the first and second ends 42, 44. The second panel 28 includes a first surface 50, which in the configuration of FIG. 4 is an upper surface, and a second surface 52, which in the configuration of FIG. 4 is a lower surface.

The first and second panels 26, 28 are substantially similarly sized, in this example. In particular, a surface area of the first surface 38 is substantially equal to the surface area of the first surface 50. Further, the first surface 38 and the first surface 50 each exhibit a surface area substantially equal to an upper surface 54 of the tailgate 22 (i.e., upper surface 54 is the upper surface when the tailgate 22 is open).

In this disclosure, the work surface of the deployable workstation 24 is provided by the uppermost surface(s) of the surfaces 38, 40, and/or 50, depending on the configuration of the deployable workstation 24. So, for example, when the deployable workstation 24 is in the configuration of FIG. 4, the work surface is provided by surfaces 38 and 50. In that configuration, surfaces 38 and 50 substantially lie in a common plane, and the common plane is substantially parallel to the ground surface G and the upper surface 54, in this example. Further, in the configuration of FIG. 4, the surface area of the work surface is substantially twice (i.e., two times) the surface area of upper surface 54.

The first and second panel 26, 28 are foldable relative to one another to vary a surface area of the work surface provided by the deployable workstation 24. Specifically, the first panel 26 is moveable relative to the second panel 28 between a folded position (FIG. 2) and an unfolded position (FIGS. 3 and 4). In the folded position, the first panel 26 substantially vertically overlaps the second panel 28. In the folded position, the second surface 40 of the first panel provides a work surface, as generally shown in FIG. 2. Movement of the first panel 26 to the unfolded position substantially doubles a surface area of the work surface.

Two hinges 56, 58 are arranged between ends 32, 42 and facilitate movement of first panel 26 relative to the second panel 28, in this example. The first panel 26 is configured to rotate substantially 180° when moving between the folded and unfolded positions.

Further, in this example, the first panel 26 includes through-openings 60, 62, which are configured to be grasped by a user to facilitate rotation of the first panel 26 between the folded and unfolded positions. The through-openings 60, 62 are not required in all examples. The first panel 26, in this example, further includes a strap 64 between through-openings 60, 62 to facilitate lowering and raising the first panel 26 as it is moved between the folded and unfolded positions.

The deployable workstation 24 includes first and second linkage assemblies 66, 68 arranged on opposite sides of the deployable workstation 24, and configured to facilitate sliding and raising of the first and second panels 26, 28 relative to the tailgate 22. The first linkage assembly 66 will now be described in more detail. It should be understood that the second linkage assembly 68 is configured substantially similarly, reflected about centerline C.

Figure 5:
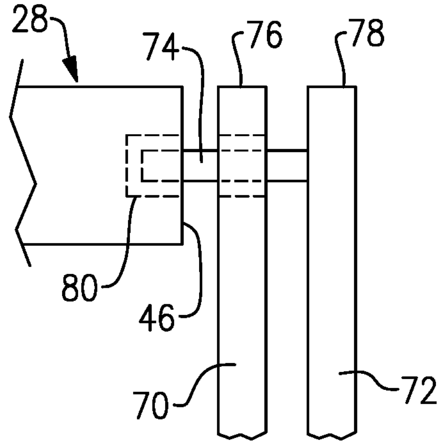
FIG. 5 is a close-up view illustrating an interface between a linkage assembly and a panel.

The first linkage assembly 66 includes a first link 70 and second link 72 connected to a pin 74 (FIG. 5) adjacent respective first ends 76, 78 thereof. As shown in FIG. 5, the pin 74 is received in a slot 80 formed in side 46 of the second panel 28. Second ends 82, 84 of the first and second links 70, 72 are moveable relative to one another within track 86 to raise and lower the first and second panels 26, 28 relative to the tailgate 22. Track 86 is attachable to upper surface 54 using known fasteners.

The distance between the second ends 82, 84 is variable to vary a height of the first and second panels 26, 28. A locking assembly is configured to hold a relative position of the first and second links 70, 72 to maintain a height of the first and second panels 26, 28. In an example, the first and second links 70, 72 are movable relative to one another to vary a height of the first and second panels 26, 28 such that the work surface is within a range of substantially 800 mm and substantially 900 mm above the ground surface G.

Figure 6:
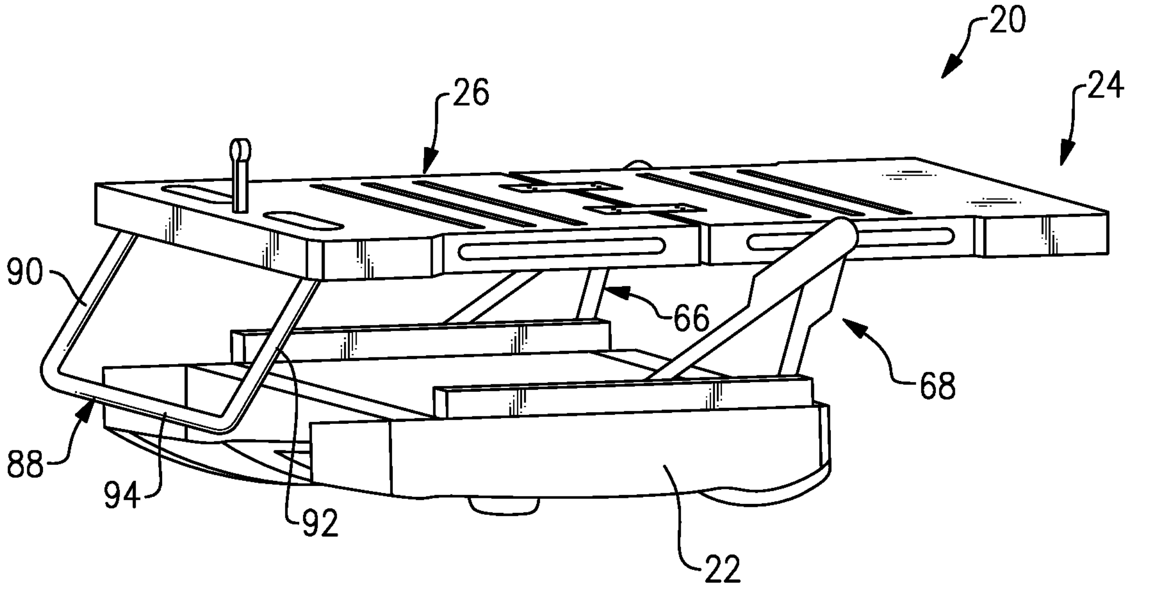
FIG. 6 is a view of the tailgate assembly and in particular illustrates a support leg of the deployable work station.

When in the raised position, the deployable workstation 24 includes a deployable support leg 88 forward of the first and second linkage assemblies 66, 68, as shown in FIG. 6. In FIG. 6, the support leg 88 is in a deployed position. The support leg 88 is configured to rotate substantially forward and downward relative to the first panel 26 to the deployed position. The support leg 88 includes two vertical portions 90, 92 arranged adjacent opposite sides 34, 36 of the first panel 26, respectively, and a horizontal portion 94 extending horizontally between ends of the vertical portions 90, 92 that are opposite the first panel 26. The first panel 26 may include a recess to hold the support leg 88 substantially flush with the surface 40 when the support leg 88 is stowed. When the support leg 88 is deployed, as in FIG. 6, the horizontal portion 94 is configured to contact either the floor 14 or the upper surface 54, as examples, to support the first and second panels 26, 28.

Figure 7:
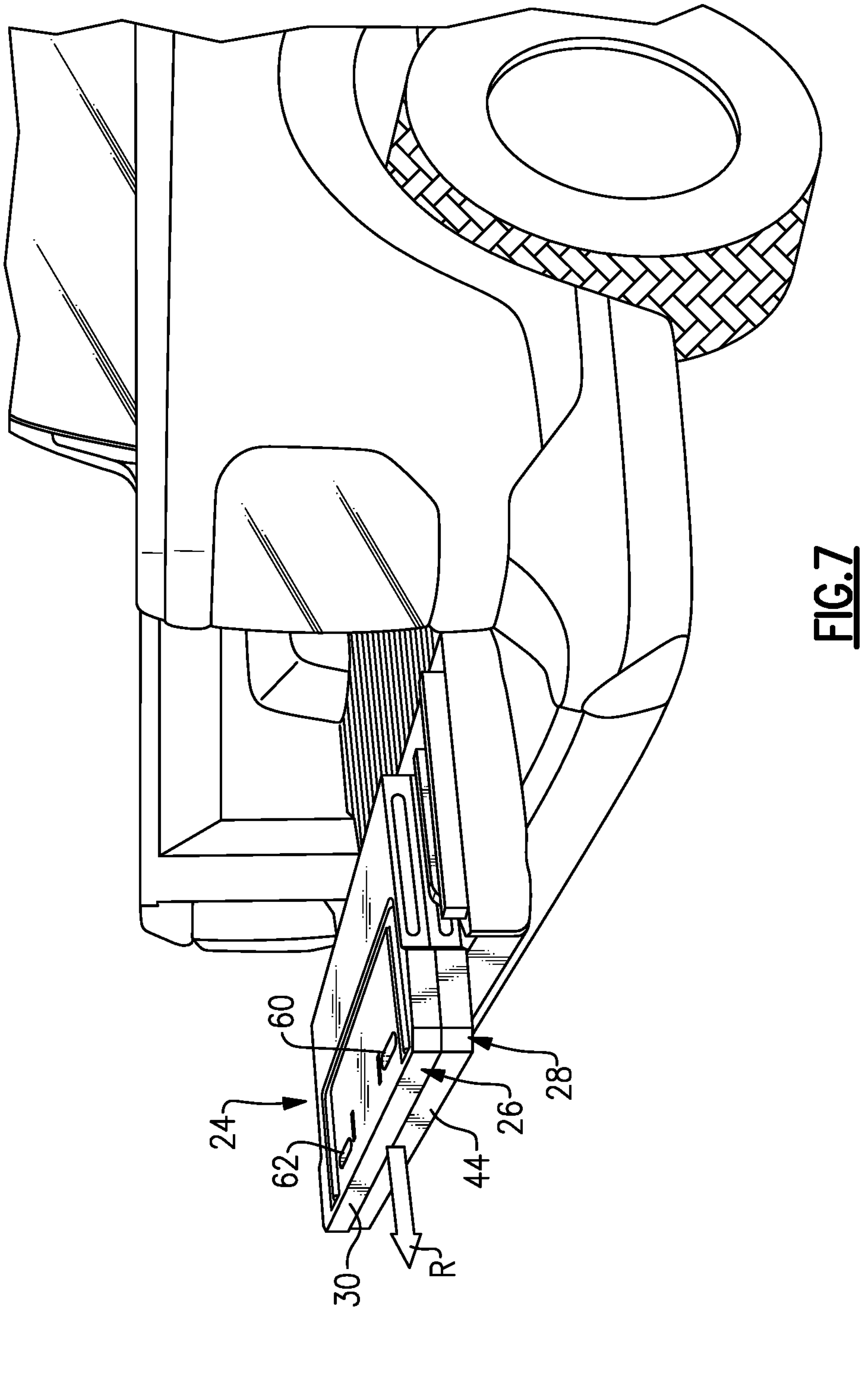
FIG. 7 is a view representative of a sliding movement of the panels of the deployable workstation.
Figure 8:
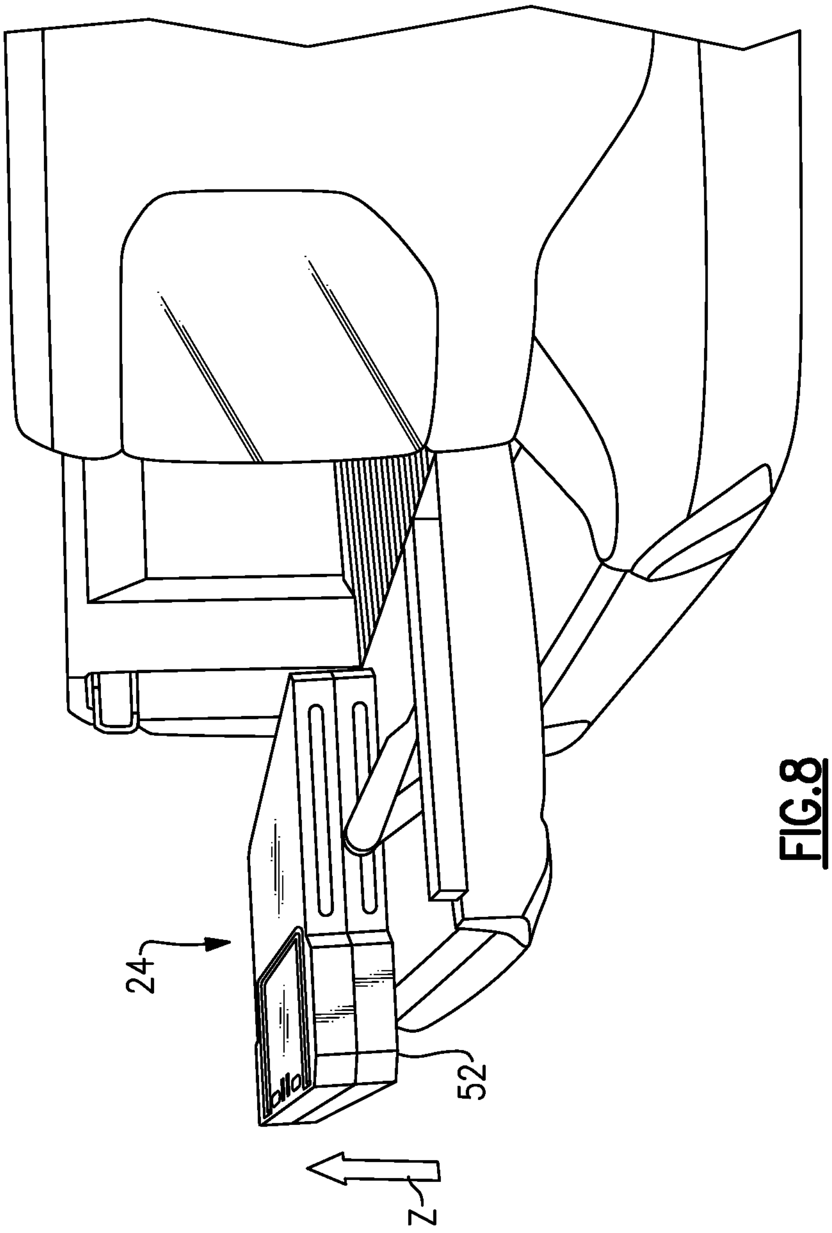
FIG. 8 is a view representative of a vertical movement of the panels of the deployable work station.
Figure 9:
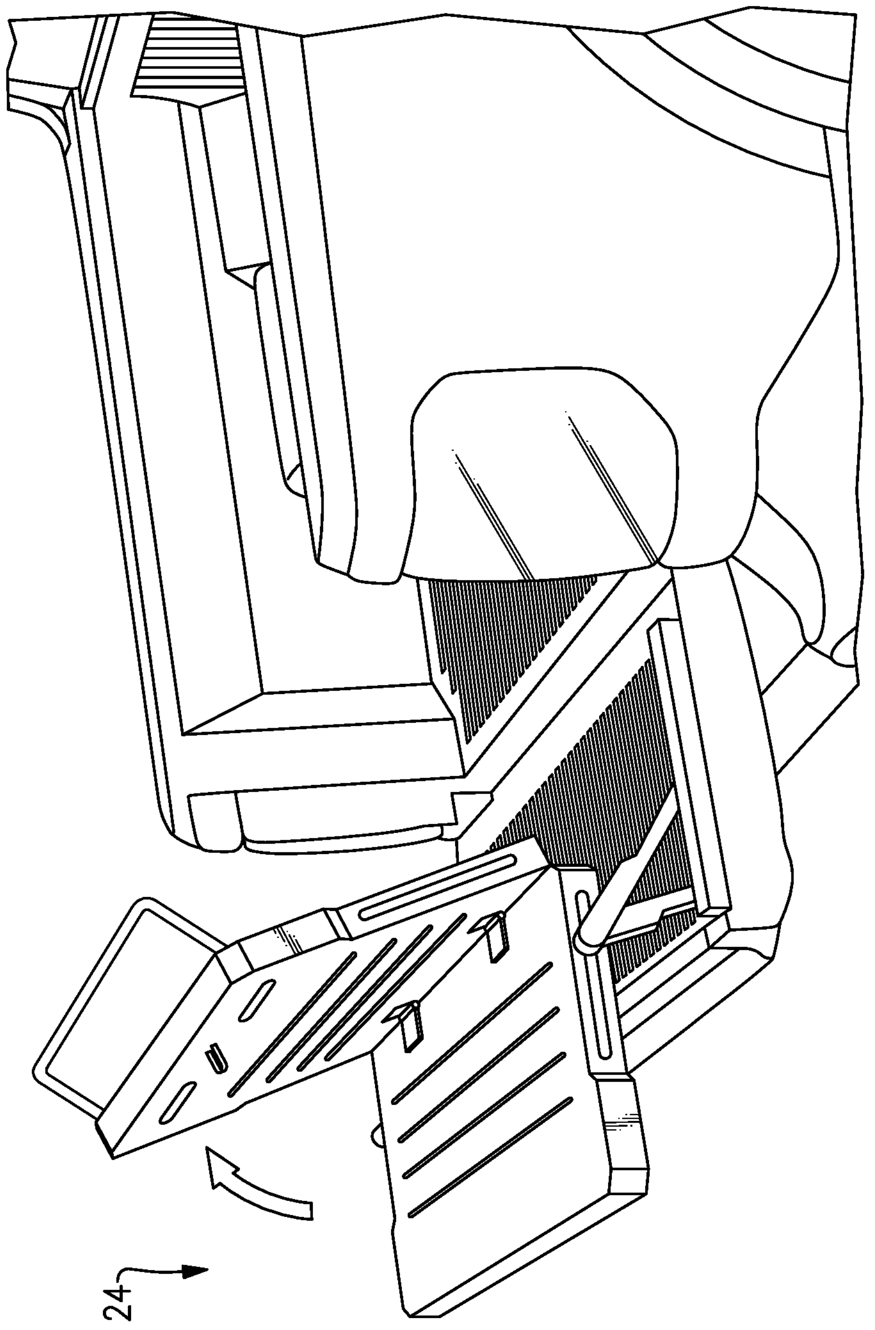
FIG. 9 is a view representative of a panel of the deployable work station being unfolded.

An example technique for deploying the deployable workstation 24 will now be described with continued reference to all drawings. In the example technique, with the tailgate 22 in the open position and the workstation in the stowed position (FIG. 2), the first and second panels 26, 28 are first slid rearwardly in direction R (FIG. 7), which is substantially perpendicular to the axis A and opposite a direction of the cargo bed 12. In an example, this first movement includes only sliding of the first and second panels 26, 28 and does not include raising of the first and second panels 26, 28. The first movement also causes ends 30, 44 to project rearward from a rearward-most end of the tailgate 22. In order to initiate the movement, the user can grasp one or both of through-openings 60, 62 and pull the first and second panels 26, 28 rearwardly. From this position, the user can readily raise the first and second panels 26, 28. Specifically, the user can grasp the surface 52 of the second panel 28, which again is now rearward of the tailgate 22, and lift both first and second panels 26, 28 in a vertical direction Z to a desired raised position, as shown in FIG. 8. When in the desired raised position, the user can selectively lock the relative position of the first and second links 70, 72 to maintain the vertical position of the first and second panels 26, 28. The user can then move the first panel 26 to the unfolded position, as shown in FIG. 9. When in the unfolded position (FIGS. 3 and 4), or as the user is moving the first panel 26 to the unfolded position, the user can deploy support leg 88.

It should be understood that terms such as "about," "substantially," and "generally" are not intended to be boundaryless terms, and should be interpreted consistent with the way one skilled in the art would interpret those terms. Further, directional terms such as "above," "below," "upper," "lower," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:

a tailgate moveable between a closed position and an open position; and a deployable workstation including at least one panel, wherein an upper surface of the at least one panel provides a work surface, wherein, when the tailgate is in the open position, the deployable workstation is movable relative to the tailgate between a stowed position and at least one raised position in which the at least one panel is raised relative to the stowed position, and wherein the deployable workstation is configured such that the at least one panel is moveable from the stowed position by sliding rearward before being raised, and wherein the deployable workstation includes a linkage assembly configured to facilitate sliding of the at least one panel relative to the tailgate without raising the at least one panel, and further configured to facilitate raising of the at least one panel relative to the tailgate.

2. The motor vehicle as recited in claim 1, wherein the at least one panel includes a first panel and a second panel.

3. The motor vehicle as recited in claim 2, wherein the first panel is rotatable relative to the second panel between a folded position and an unfolded position to vary a surface area of the work surface.

4. The motor vehicle as recited in claim 3, wherein, in the folded position, the first panel substantially vertically overlaps the second panel.

5. The motor vehicle as recited in claim 3, wherein, in the unfolded position, a surface of the first panel and a surface of the second panel provide the work surface.

6. The motor vehicle as recited in claim 5, wherein, in the unfolded position, the work surface exhibits a surface area substantially twice the surface area of an upper surface of the tailgate.

7. The motor vehicle as recited in claim 3, wherein the first panel includes a first through-opening and a second through-opening configured to be grasped by a user, and wherein, in the folded position, the first through-opening and the second through-opening are adjacent a rearward edge of the first panel.

8. The motor vehicle as recited in claim 7, wherein the first panel includes a strap extending between the first through-opening and the second through-opening, and wherein, in the unfolded position, the strap is adjacent a forward edge of an upper surface of the first panel.

9. The motor vehicle as recited in claim 1, wherein the deployable workstation includes a support leg forward of the linkage assembly.

10. The motor vehicle as recited in claim 9, wherein the support leg includes first and second vertical portions and a horizontal portion extending between the first and second vertical portions, and wherein, when the support leg is deployed, the horizontal portion is configured to contact a floor of a cargo area of the motor vehicle or the tailgate.

11. The motor vehicle as recited in claim 9, wherein the at least one panel includes a recess configured to receive the support leg such that the support leg is substantially flush with a surface of the at least one panel when the support leg is in a stowed position.

12. A motor vehicle, comprising:

a tailgate moveable between a closed position and an open position; and a deployable workstation including at least one panel, wherein an upper surface of the at least one panel provides a work surface, wherein, when the tailgate is in the open position, the deployable workstation is movable relative to the tailgate between a stowed position and at least one raised position in which the at least one panel is raised relative to the stowed position, and wherein the deployable workstation is configured such that the at least one panel is moveable from the stowed position by sliding rearward before being raised, wherein the deployable workstation includes a linkage assembly configured to facilitate sliding and raising of the at least one panel relative to the tailgate, wherein the linkage assembly includes a first link and second link connected to a pin adjacent respective first ends thereof, and wherein the pin is received in a slot formed in a side of the at least one panel.

13. The motor vehicle as recited in claim 12, wherein second ends of the first and second links are moveable relative to one another to raise and lower the at least one panel.

14. The motor vehicle as recited in claim 12, wherein the at least one raised position includes a plurality of raised positions, and each of the raised positions corresponds to a different distance between the second ends of the first and second links.

15. A method, comprising:

opening a tailgate of a motor vehicle;

after opening the tailgate, sliding at least one panel of a deployable workstation rearward relative to the tailgate without also raising the at least one panel, wherein the at least one panel is configured to provide a work surface; and after sliding the at least one panel, raising the at least one panel relative to the tailgate such that the at least one panel provides a work surface in a vertically higher position than before the at least one panel was raised, wherein the deployable workstation includes a linkage assembly, and wherein the linkage assembly facilitates both the sliding of the at least one panel and the raising of the at least one panel.

16. The method as recited in claim 15, wherein the at least one panel includes a first panel and a second panel, and wherein the method further comprises rotating the first panel relative to the second panel from a folded position to an unfolded position to provide a work surface having a surface area substantially twice an upper surface of the tailgate.

17. The method as recited in claim 15, wherein the method further comprises moving a support leg to a deployed position to support the at least one panel, and wherein the support leg is forward of the linkage assembly.

* * * * *